United States Patent [19]

Takeda et al.

[11] Patent Number: 5,188,891
[45] Date of Patent: Feb. 23, 1993

[54] MAGNETIC RECORDING MEDIUM COMPRISING A POLYESTER FILM SUBSTRATE, A MAGNETIC COATING AND A SPECIFIED BACK COAT LAYER

[75] Inventors: Naohiro Takeda, Yokohama; Yuzo Otani, Tokyo; Nariaki Okajima, Yokohama; Yoshihiko Ito, Yokohama; Shin-ichi Kinoshita, Yokohama; Masashi Inagaki, Machida; Takashi Harada, Yokohama, all of Japan

[73] Assignee: Diafoil Company, Limited, Tokyo, Japan

[21] Appl. No.: 719,072

[22] Filed: Jun. 25, 1991

Related U.S. Application Data

[63] Continuation of Ser. No. 288,280, Dec. 22, 1988, abandoned.

[30] Foreign Application Priority Data

Dec. 25, 1987 [JP] Japan ................... 62-329251
Apr. 19, 1988 [JP] Japan ................... 63-96146
Sep. 8, 1988 [JP] Japan ................... 63-225070

[51] Int. Cl.⁵ .................................................. G11B 5/00
[52] U.S. Cl. ........................................ 428/323; 428/336; 428/423.7; 428/694; 428/900
[58] Field of Search ................ 428/323, 336, 423.7, 428/694, 900

[56] References Cited

U.S. PATENT DOCUMENTS

| | | | |
|---|---|---|---|
| 4,404,253 | 9/1983 | Kohler et al. | 428/327 |
| 4,414,270 | 11/1983 | Miyoshi et al. | 428/325 |
| 4,670,319 | 6/1987 | Katoh et al. | 428/141 |

Primary Examiner—Paul J. Thibodeau
Assistant Examiner—Stevan A. Resan
Attorney, Agent, or Firm—Oblon, Spivak, McClelland, Maier & Neustadt

[57] ABSTRACT

Disclosed herein is a magnetic recording medium comprising a polyester film layer, a coating type magnetic layer provided on one side of said polyester film layer, and a back-coat layer provided on the other side of said polyester film layer.

4 Claims, 1 Drawing Sheet

MAGNETIC RECORDING MEDIUM COMPRISING A POLYESTER FILM SUBSTRATE, A MAGNETIC COATING AND A SPECIFIED BACK COAT LAYER

This application is a continuation of application Ser. No. 07/288,280, filed On Dec. 22, 1988, now abandoned.

BACKGROUND OF THE INVENTION

The present invention relates to a magnetic recording medium having a back-coat layer, which is excellent in running durability, antistatic property and light screening property.

A magnetic recording medium, in particular, a video tape and an audio tape is preferably provided with a back-coat layer in order to stabilize the running property, suppress static electrification, suppress the wear of the tape by means of a fixing pin and optically detect the position. There are two methods for forming a back-coat layer. One is a method of forming a back-coat layer simultaneously with or subsequently to the steps of applying a magnetic layer to a biaxially stretched polyester film, orienting and drying it, and the other is a method of forming a back-coat layer in the re-coating process after the formation of the magnetic layer. Both of these methods, however, have problems. Since the coating of the magnetic layer or the back-coat layer is required to have accuracy, when the coating of the magnetic layer and the back-coat layer is carried out simultaneously or continuously, the yield is lowered. While if the coatings of those layers are carried out in separate processes, the manufacturing cost is raised.

The back-coat layer is required to have various properties. A polyester film obtained by an in-line coating method is required to have an excellent winding property and to exhibit excellent running property, winding property and running durability after it is formed into a magnetic tape.

The present inventors fixed their eyes on the in-line coating method which is capable of producing a stretched film having an accurate coating layer with good adhesion with the base film at a comparatively low cost, and studied a method of forming a back-coat layer of a magnetic recording medium. As a result, it has been found that a magnetic recording medium comprising a polyester film provided with a coating-type magnetic layer on one side thereof and a back-coat layer formed by an in-line coating method on the other side thereof is excellent in running durability, antistatic property and light screening property. The present invention has been achieved on the basis of this finding.

SUMMARY OF THE INVENTION

In an aspect of the present invention, there is provided a magnetic recording medium comprising a polyester film provided with a coating-type magnetic layer on one side thereof and a back-coat layer formed by an in-line coating method on the other side thereof.

BRIEF DESCRIPTION OF THE DRAWING

The FIGURE is a schematic view of a device for measuring the coefficient of friction between the back-coat layer and a metal pin of a magnetic recording medium according to the present invention.

DETAILED DESCRIPTION OF THE INVENTION

Figure 1:
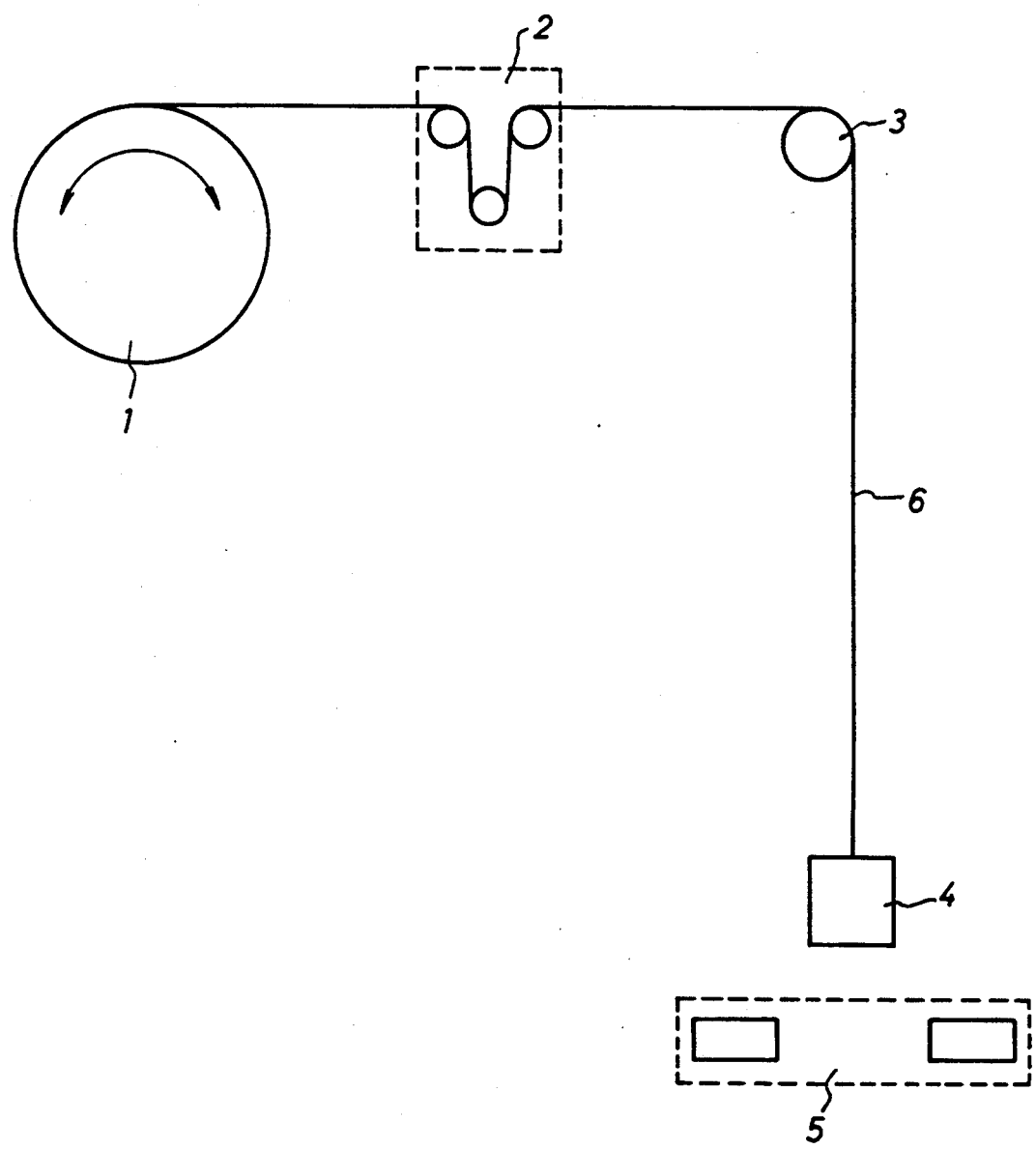

A "polyester" of a polyester film which constitutes a base film of a magnetic recording medium of the present invention is a polyethylene terephthalate having not less than 80 mol % of ethylene terephthalate units or a polyethylene naphthalate having not less than 80 mol % of ethylene naphthalate units.

The polyester film which constitutes the base film of a magnetic recording medium of the present invention may contain additional particles, deposited particles, a polyester having a property different from that of the base polyester or a polymer other than a polyester in order to form projections on the surface of the film. The surface roughness of the polyester film of the base film can be adjusted by a method known to those skilled in the art by selecting the kind, the mixing amount and the size of a protrusion forming agent in accordance with properties required of the magnetic recording medium of the present invention such as the slip property and the magnetic characteristics.

In addition to the protrusion forming agent, the polyester film which constitutes the base film of the magnetic recording medium may contain an antistatic agent, stabilizer, lubricant, coloring agent, light screening agent, etc. in accordance with the properties required of the magnetic recording medium of the present invention.

The properties of the polyester film which constitutes the base film of the magnetic recording medium such as orientation, crystallizability, mechanical properties and dimensional stability can be adjusted by selecting the film-forming conditions known to those skilled in the art in accordance with the properties required of the magnetic recording medium of the present invention.

The polyester film which constitutes the base film of the magnetic recording medium may be composed of a single layer. Alternatively, it may be produced by co-extrusion so as to have two layers having different surface roughness or three layers having a light screening layer as an intermediate layer.

The surface of the side of the polyester film on which the magnetic layer is formed may be very flat. The surface roughness, however, may be appropriately selected in consideration of the susceptibility to scuff in the film forming process, the workability in the applying process of the magnetic layer, the accuracy of the magnetic characteristics of the coating-type magnetic layer itself and the purpose of use of the magnetic recording medium. For example, the appropriate center line average roughness (Ra) is about 0.01 $\mu$m for a high-grade video tape, about 0.02 to 0.3 $\mu$m for a standard video tape and about 0.04 to 0.05 $\mu$m for an audio tape. When the polyester film is used for a floppy disk provided with the magnetic layer only on one side such as a video floppy, the center line average roughness of the polyester film is preferably about 0.005 to 0.03 $\mu$m.

The thickness of the polyester film which constitutes the base of a magnetic recording medium of the present invention is ordinarily 5 to 75 $\mu$m.

The coating type magnetic layer in the present invention is produced by a method known to those who are skilled in the art, namely, by dispersing a magnetic powder such as Y-iron oxide, cobalt-containing iron oxide, chromium dioxide, pure iron and barium ferrite in an organic solvent together with a binder resin, cross linking agent, polishing agent, lubricant, antistatic agent, dispersant, etc., applying the resultant dispersion to the base polyester film, magnetically orienting the layer in a damp-dried state, and drying, calendering and aging the magnetic layer. The thickness of the magnetic layer is ordinarily 1 to 8 μm.

The in-line coating adopted in the present invention is a method of coating in the process of forming a polyester film, as disclosed in Japanese Patent Publication No. 41.8470 (1966), and is characterized in that the film is stretched after the coating of the coating liquid.

Various methods of applying a coating liquid to a unstretched polyester film by using a reverse roll coater, gravure coater, rod coater, air doctor coater or other coating devices are described in the "Coating Method" by Yuji Harasaki, published by Hara Shoten (1979), and biaxially stretching the resultant film simultaneously with or subsequently to the coating; a method of applying a coating liquid to a uniaxially stretched polyester film and further stretching the film in the direction orthogonal to the direction of uniaxial orientation; a method of re-stretching a biaxially stretched film having a coating layer; and a method of applying a coating liquid to a biaxially stretched polyester film and re-stretching the film in the transverse direction and/or machine direction.

The stretching process is preferably carried out at a temperature of 60° to 130° C., and the stretch ratio is at least 4 times, preferably 6 to 20 times by area. The stretched film is subjected to heat treatment at 150° to 250° C.

The stretched film is preferably loosened in the machine and transverse directions by 0.2 to 20% at the maximum temperature zone of heat treatment and/or the cooling zone at the exit of heat treatment.

An especially preferable method is a method of applying a coating liquid to a uniaxially stretched polyester film by 2 to 6 times at 60° to 130° C. by roll stretching, stretching the uniaxially stretched polyester film in the direction orthogonal to the direction of uniaxial orientation by 2 to 6 times at 80° to 130° C. after appropriate drying or immediately after the coating without drying, and subjecting the film to heat treatment at 150° to 250° C. for 1 to 600 seconds. According to this method, it is possible to dry the coating layer simultaneously with stretching, and to reduce the thickness of the coating layer in correspondence with the stretch ratio, thereby obtaining a polyester film suitable for the base of a magnetic recording medium at a comparatively low cost.

An adhesive layer, a conductive layer or the like which constitutes an priming layer of the magnetic layer may be formed on the opposite side of the film to the back coat layer by in-line coating method simultaneously with the formation of the back-coat layer by in-line coating method.

The film may be subjected to chemical treatment or discharging treatment for improving the coating property of a coating liquid to the film and the adhesiveness.

The thickness of the back-coat layer in the present invention is preferably 0.2 to 1.5 μm. If the thickness of the back-coat layer is less than 0.2 μm, the strength of the layer is so low that the layer may be scraped as the number of times of running increases, thereby occurring dropout due to abrasion dust and unstable running property, and lowering the antistatic property and the light screening property. On the other hand, even if the thickness of the back-coat layer is more than 1.5 μm, the effect of providing the back-coat layer is not improved to that degree but rather the following problems are brought about. Since a large amount of coating liquid is used, the manufacturing cost is raised, and since a thick magnetic recording medium restricts the winding length, the information recording time is disadvantageously shortened.

The center line average roughness (Ra) of the back-coat layer in the present invention is preferably 0.015 to 0.10 μm. If the center line average roughness (Ra) is less than 0.015 μm, the slip property is bad, and if it is more than 0.10 μm, the magnetic characteristics is deteriorated due to the transfer of the coarse roughness of the back-coat layer to the surface of the magnetic layer.

The coefficient of friction between the back-coat layer and the metal pin in the present invention is preferably 0.12 to 0.30. If the coefficient of friction is less than 0.12, the tape slips too much for stable running. If it is more than 0.30, since the tape is difficult to slip, the running property becomes unstable and the back-coat layer may be scraped by a guide pin or the like.

It is necessary that the back-coat layer in the present invention has good surface projections and is firmly contacted closely with the base polyester film so as to be integral with the base film. The back-coat layer is also required not to contaminate the devices for applying, stretching and drying the magnetic layer; not to be transferred to a calender roll during the calendering process; not to be blocked with the magnetic layer or transferred to each other while aging the magnetic layer or in the state in the which magnetic recording medium is incorporated into a pancake or a cassette; and to have running durability when the magnetic recording medium is mounted on a cassette tape recorder. In order to satisfy these required properties, selection of a binder polymer and combination of binder polymers are important.

An aqueous polymer which satisfies the above-described properties is preferably used for the back-coat layer in the present invention. Such an aqueous polymer is selected from, for example, polyurethanes, polyesters and polyacrylates but is not restricted thereto. Polymers obtained by reacting a polymerizable compound with polyester as the main polymer such as those described in Japanese Patent Application Laid-Open (KOKAI) Nos. 62-267310 (1987), 63-37937 (1988) and 63-46237 (1988) (European Patent No. 260203) and Japanese Patent Application No. 62-324468, and polymers reacted with a polymerizable compound in the presence of a polyurethane can provide the back-coat layer with both the coating film strength which is characteristic of polyesters and polyurethanes and the slip property, moisture vapor resistance, etc. which are characteristic of polyacrylate or the like. The "aqueous" binder polymer is the present invention means a binder polymer which is soluble or dispersible in water.

The aqueous polyurethane used in the present invention is a water-soluble or water-dispersable polyurethane which uses water as the main medium, and may be cationic, nonionic or anionic. From the points of view of stability of an aqueous polyurethane, combination with another component, the property of a coating film produced therefrom, safety and hygiene, a polyurethane having an anionic group is particularly preferable. Examples of a polyurethane having an anionic group are described in Angew. Markomol. Chem., 98, PP 133 to 165 (1981), Japanese Patent Publication Nos. 42.24194 (1967) (U.S. Pat. No. 3,461,103), 46-7720 (1971) (U.S. Pat. No. 3,539,483), 46-10193 (1971) (U.S.

Pat. No. 3,522,199 ), 49.37839 (1974), and Japanese Patent Application Laid-Open (KOKAI) Nos. 50-123197 (1975) (U.S. Pat. No. 4,245,110 ), 53-126058 (1978), 54-138098 (1979) (U.S. Pat. No. 4,303,774), 61-36314 (1986) and 57-125048 (1972). These known polyurethanes or polyurethanes similar thereto are usable in the present invention.

The main components of a polyurethane are polyisocyanate, polyol, a chain lengthening agent, a cross linking agent, and the like.

As the polyisocyanate, tolylene diisocyanate phenylene diisocyanate, 4,4'-diphenylmethane diisocyanate, hexamethylene diisocyanate, xylylene diisocyanate, 4,4'-dicyclohexylmethane diisocyanate and isoboron diisocyanate may be exemplified.

As the polyol, polyethers such as polycarbonate polyol, polyoxyethylene glycol, polyoxypropylene glycol, polyoxytetramethylene glycol; polyesters such as polyethylene adipate, polyethylene-butylene adipate and polycaprolactam; acrylic polyols; and castor oil may be exemplified.

As the chain-lengthening agent or the cross-linking agent, ethylene glycol, propylene glycol, butane diol, diethylene glycol, trimethylol propane, hydradine, ethylene diamine, diethylene triamine, 4,4'-diaminodiphenylmethane, 4,4'-diaminodicyclohexylmethane and water may be exemplified.

A polyurethane having an anionic group is produced, for example, by a method of reacting a compound having an anionic group with the components of polyurethane such as a polyol, a polyisocyanate compound and a chain-lengthening agent; a method reacting a compound having an anionic group with the unreacted isocyanate group of the produced polyurethane; and a method of reacting a group having active hydrogen of a polyurethane with a compound having an anionic group.

In a method of using a compound having an anionic group as the components of forming a polyurethane, sulfonated aromatic isocyanate compounds obtained by sulfonating aromatic isocyanates, diaminocarboxylate, and the sulfates of amino.alcohols are usable.

As a compound having an anionic group which is reacted with the unreacted isocyanate group of a polyurethane, bisulfites, aminosulfonic acid and the salts thereof, aminocarboxylic acid and the salts thereof, the sulfates and salts of amino.alcohols and hydroxyacetic acid and the salts thereof may be exemplified.

As a compound having an anionic group which reacted with a group having active hydrogen of a polyurethane, three- to seven-membered-ring cyclic compounds having a salt type group or a group producing a salt after the ring is open, such as dicarboxylic acid anhydrides, tetracarboxylic acid anhydrides, sultone, lactone, epoxycarboxylic acids, epoxysulfonic acids, 2,4-dioxo-oxazolidine, isatoic acid anhydrides, phostone and carbyl sulfate may be exemplified.

In the case of polyesterpolyurethane, an anionic group is introduced to a polyurethane by using a polyester having the anionic group. A polyester having an anionic group is obtained by combining a compound having a sulfonate group or a carboxylate group with a polyester by copolymerization or graft polymerization.

As the polyurethane, a resin compound composed of a polyol having a molecular weight of 300 to 20000, polyisocyanate, and a compound having a reactive hydrogen atom, and at least one of a group reacting with a chain-lengthening agent and an isocyanate group, and anionic group is preferable.

The anionic group in the polyurethane is used as a lithium salt, sodium salt, potassium salt or magnesium salt of —$SO_3H$, —$OSO_3H$, —COOH or the like.

The content of the anionic group in the polyurethane is preferably 0.05 to 8 wt. %. If the content of the anionic group is too small, the water-solubility or the water-dispersibility of the polyurethane resin is lowered. On the other hand, if it is too large, the water resistance of the priming layer is deteriorated or the film absorbs moisture and is apt to be blocked with each other.

An aqueous polyester, in particular, a polyester having an anionic group is also preferable as an aqueous binder polymer. The polyester having an anionic group is water-soluble or water-dispersible, and as the dicarboxylic acid component, aromatic dicarboxylic acids such as terephthalic acid, isophthalic acid and 2,5-naphthalenedicarboxylic acid; aliphatic dicarboxylic acids such as adipic acid, azelaic acid and sebatic acid; oxycarboxylic acids such as oxybenzoic acid and the ester-forming derivatives thereof are usable. As the glycol component of the polyester having an anionic group, aliphatic glycols such as ethylene glycol, 1,4-butane diol, diethylene glycol and triethylene glycol; alicyclic glycols such as 1,4-cyclohexanedimethanol; aromatic diols such as p-xylenediol; and poly(oxyalkylene) glycols such as polyethylene glycol, polypropylene glycol and polytetramethylene glycol are usable. The polyester having an anionic group is not only a saturated linear polyester of the above-described ester forming components, but also a polyester containing a compound having not less than three ester-forming components or a compound having a reactive unsaturated group as the polyester component.

The anionic group of the polyester having an anionic group means sulfonic acid, carboxylic acid or a salt thereof. The "salt" in the sulfonate or carboxylate means an ammonium salt, amine salt such as methylamine and ethanolamine, and a metal salt such as lithium salt, sodium salt, potassium salt and magnesium salt. As the polyester having a sulfonate group, the polyesters described in Japanese Patent Publication No. 47.40873 (1972) (U.S. Pat. Nos. 3,546,008, 3,734,874 and 3.779.993) and Japanese Patent Application Laid-Open (KOKAI) Nos. 50-83497 (1975), 50-121336 (1975) and 52-155640 (1977) and polyesters similar thereto are usable. A sulfonate group is introduced to a polyester, for example, by copolymerizing sulfoisophthalic acid, sulfoterephthalic acid, 4-sulfonaphthalene-2,7-dicarboxylic acid or a metal salt such as an ester-forming derivative thereof with a polyester by adding such an acid or metal salt to the polyester during the process of ester exchange or polymerization; by a method of sulfonating the unsaturated group of a polyester obtained by the polymerization of an ester-forming aliphatic unsaturated compound by a sulfonating agent such as sodium hydrogensulfite and sodium metasulfite; and by a method of graft-polymerizing styrene sulfonate, methacryl sulfonate or the like with a polyester by using a radical initiator or the like. A carboxylate group is introduced to a polyester, for example, by reacting a dioxy compound having a carboxylate group with a polyester, as disclosed in Japanese Patent Application Laid-Open (KOKAI) No. 61.228030 (1986); and by a method of introducing acrylate, methacrylate or the like to a polyester by using a radical initiator or the like.

The content of the anionic group in the polyester is preferably in the range of 1 to 10 wt. % based on the total weight of the polyester having the sulfonate group or the carboxylate group. If the content of the anionic acid in the polyester is less than 1 wt. %, the water-solubility and water-dispersibility of the polyester are insufficient, while if it is more than 10 wt. %, the water resistance of the coating layer is apt to be lowered.

A polyester having an anionic group may be produced by modifying a compound having a carbon double bond and a silicon group, fluorinated alkyl group, epoxy group, or amido group by graft polymerization.

The molecular weight of a polyester having an anionic acid is preferably 5000 to 50000.

The back-coat layer in the present invention preferably contains fine particles. Fine particles form projections on the surface of the back-coat layer, thereby providing the back-coat layer with a slip property. The preferred content of the fine particles in the back-coat layer is different depending upon the specific gravity of the fine particles but is preferably 10 to 60 wt. %. If the content of fine particles in the back-coat layer is less than 10 wt. %, the density of the projections is lowered because the film is stretched after coating in in-line coating, thereby occurring problems such as bad slip property, scraped film and the transfer of the surface roughness of the back-coat layer to the surface of the magnetic layer. If it is more than 60 wt. %, the amount of binder resin is relatively reduced, the strength of the coating film is lowered and the back-coat layer is apt to be separated or scraped.

The fine particles used in the present invention are inorganic and/or organic particles. As the inorganic particles, calcium carbonate, silica, titanium oxide, carbon black, graphite, kaolin, talk, alumina, barium salt, antimony oxide, zirconium and conducting metal particles may be exemplified, but the inorganic particles are not restricted thereto. Carbon black and synthetic calcium carbonate particles are preferable.

As the organic particles, benzoguanamine particles, silicon particles, epoxy resin particles, polyamide particles, acrylic resin particles, acryl-styrene resin particles, phenol resin particles, fluorine resin particles and polyolefin particles may be exemplified, but the organic particles are not restricted thereto. Many organic particles have a better affinity with a binder resin and a higher coating film strength than inorganic particles. Among these, aqueous fluorine polymer particles are preferably used.

The preferred average diameter of the fine particles is different depending on the thickness of the coating layer, but is generally 0.01 to 0.5 $\mu$m. If the average particle diameter is less than 0.01 $\mu$m, the formation of projections is insufficient and as a result, the slip property is bad depending upon some mixing amount. On the other hand, if the average particle diameter is more than 0.5 $\mu$m, the particles are apt to be slipped off the coating film and when the particles cohere, they constitute coarse projections which deteriorate the magnetic characteristics.

Carbon black is preferably contained in the back-coat layer in the present invention. Carbon black forms projections on the surface of the back-coat layer, thereby improving the handling property of the film and the running property of a magnetic recording medium. Since carbon black has a good affinity with a binder resin, the film thickness and durability which would not be achieved by other inorganic resins are exhibited. In addition, carbon black is capable of providing a magnetic recording medium with a high antistatic property having little moisture dependency which would be difficult for general ionic antistatic agents to achieve, and light screening property which would be difficult for other compounds to achieve, so that it is possible to reduce the amount of light screening agent which is conventionally contained in a magnetic layer, thereby improving the magnetic characteristics.

The average particle diameter of carbon black used in the back-coat layer in the present invention is preferably 0.01 to 0.20 $\mu$m. If the average particle diameter is less than 0.01 $\mu$m, the viscosity of the coating liquid is increased depending on some concentration of carbon black and some kind of dispersant, and due to the rheological properties of the coating liquid, the handling property and the coating property thereof are deteriorated. On the other hand, if the average particle diameter exceeds 0.20 $\mu$m, carbon black particles are more likely to cohere on the surface of the back-coat layer than other particles, and disadvantageously form coarse protrusions on the back-coat layer, so that the protrusions slip off and the coarse protrusions are transferred to the surface of the magnetic layer, thereby deteriorating the magnetic characteristics. Carbon black used for the back-coat layer in the present invention is required to have water-dispersibility, stability with the other components in the coating liquid, uniform dispersibility in the binder after the formation of the back-coat layer, and to provide the back-coat layer with appropriate surface roughness, color tone and light-screening antistatic property. These properties required of carbon black can be adjusted by appropriately selecting the raw material, manufacturing method, particle diameter, specific surface area, chemical structure of the surface, method of dispersing in an aqueous medium, etc. of carbon black.

For example, in the case of taking a serious view of not only the surface roughness but also the antistatic property of the back-coat layer, a conducting carbon black in which the chemical structure of the surface, the porosity and the structure of an aggregate are well designed by the manufacturing method may be used, but due to the particle properties, the carbon black is apt to have a high viscosity in the state of being dispersed in water. In order to improve the dispersibility at a slight sacrifice of the conductive properties, carbon black having a small specific surface area or oil absorbing property may be used. The color tone of carbon black is varied from a black color very close to pitch-blackness to a black color tinged with red in accordance with the manufacturing method. These color tones have different optical absorbances and may be selected in accordance with the purpose of use. It is also possible to improve the color tone by mixing various color tones.

For example, even when it is necessary to use reddish carbon black due to the properties, it is possible to change the color tone from reddish black to a black color closer to pitch-blackness by using a blue pigment theretogether in order to improve the absorbance and the external color tone of the back-coat layer.

The content of the carbon black in the back-coat layer is preferably 10 to 50 wt. %. If the content of the carbon black is less than 10 wt. %, the surface roughness of the back-coat layer becomes small depending upon some thickness of the back-coat layer and some dispersibility of the carbon black, which may lead to insufficient slip property, anti-static property and light screening property. On the other hand, if the content of the carbon black exceeds 50 wt. %, the viscosity of the coating liquid is increased, thereby deteriorating the handling property and the coating property thereof, so that cracking is apt to be produced during in-line coating. Such cracking unfavorably produces coarse projections such as longitudinal projections, meandering projections and ridgy projections, thereby deteriorating the magnetic characteristics, or disconnecting the back-coat layer, which may lead to the lowering of the antistatic property, light screening property and the coating film strength.

Even if longitudinal projections are produced, in the case where the surface roughness of the back-coat layer is in the appropriate range, the back-coat layer is usable. If longitudinal projections are not isolated and reticulately connected to each other, an effective antistatic property is obtained. However, it is preferable that no longitudinal projections are produced and the back-coat layer has a uniform surface.

By using the back-coat layer in the present invention containing carbon black and an aqueous fluorine polymer, it is possible to improve the running durability and winding property, and to prevent the magnetic layer from the transfer to the back-coat layer. As the aqueous fluorine polymer, aqueous dispersions such as an ethylene tetrafluoride polymer, ethylene trifluorochloride polymer, vinylidene fluoride polymer, vinyl fluoride polymer, ethylene-ethylene tetrafluoride copolymer, ethylene tetrafluoride-propylene hexafluoride copolymer, ethylene tetrafluoride-perfluoroalkylvinyl ether copolymer, ethylene-ethylene trifluorochloride copolymer, ethylene tetrafluoride-propylene hexafluoride perfluoroalkylvinyl ether copolymer and ethylene tetrafluoride-perfluorosulfonyl fluoride vinyl ether copolymer are usable. The preferred average particle diameter of the aqueous fluorine polymer in the back-coat layer is different depending upon the thickness of the back-coat layer but is generally 0.05 to 0.3 μm, more preferably 0.08 to 0.2 μm. If the particle diameter of the aqueous fluorine polymer is larger than 0.3 μm, the surface of the back-coat layer becomes coarse and the coarse surface may be transferred to the magnetic layer, thereby deteriorating the magnetic characteristics. On the other hand, if it is less than 0.05 μm, the effect of forming projections on the surface and as a result, the effect of improving the running property and the winding property are small. The preferred content of the aqueous fluorine polymer in the back-coat layer is different depending upon the particle diameter, but is generally 0.1 to 2.0 wt. %, more preferably 0.5 to 10 wt. %. If the content of the aqueous fluorine polymer in the back-coat layer is more than 20 wt. %, the aqueous fluorine polymer is apt to be slipped off, which may lead to the deterioration of the magnetic characteristics. On the other hand, if it is less than 0.1 wt. %, the effect of improving the surface properties of the back-coat layer is unfavorably insufficient.

The back-coat layer in the present invention may contain, as a cross-linking agent for ameliorating the blocking property and improving the water resistance, solvent resistance and mechanical strength, a methylolized or alkylolized urea compound, a melamine compound, a guanamine compound, an acrylamide compound, a polyamide compound, an epoxy compound, an aziridine compound, block polyisocyanate, a silane coupling agent, a titanium coupling agent, a zirconium aluminate coupling agent, a vinyl compound reactive to heat, peroxide, and light, or a photosensitive resin.

It is also possible to provide properties which correspond to the purpose of use by adding a lubricant, antistatic agent, dye, vinyl resin, olefin resin or the like to the back-coat layer, if necessary.

The present invention will be explained in detail with reference to the following non-limitative examples. Evaluations in the examples were made in the following manners and the results are shown in Table 1.

(1) Surface roughness

The center line average roughness (Ra) was measured in the following way in accordance with JIS B0601. A contact type surface roughness measuring machine Surfcorder SE—3F (trade name: produced by Kosaka Kenkyusho Co., Ltd.) was used. Under the conditions that the diameter of the probe PUDJ was 2.0 μm and the load was 30 mg, the film surface was measured over the length of 25 mm at a rate of 0.1 mm/sec. The roughness curve was obtained by enlarging the results to 100 times in the direction of the reference length and to 50000 times in the direction of surface roughness. From the roughness curve a portion of measuring length (L) was cut out in the direction of the center line. On the assumption that the center line of the cut-out portion was the axis X, the machine direction was the axis Y, and the roughness curve was represented by y=f(x), the surface roughness (μm) was obtained from the following formula:

$$Ra = \frac{1}{L} \int_0^L |f(x)| dx$$

The cut-off value was 0.8 mm. The surface roughness was measured at 12 points and the average value was obtained from the measured values at 10 points excepting the maximum and minimum values.

In the similar way, the maximum height (Rt) and the average roughness (Rz) of 10 points were obtained.

(2) Coefficient of friction (A) Coefficient of friction between the back-coat layer and the polyester film In accordance with ASTM D-1894, the coefficient of friction was measured by a modified method which enables samples to be measured in the shape of a tape. A film provided with a coating layer was placed on a film having no coating layer with the coating layer inside and cut to a shape of a tape of 15 mm wide. The coefficient of friction between the tapes was measured under the conditions that the load was 100 g and the pulling rate was 20 mm/min at a temperature of 23° C. and a RH of 50%.

(B) Coefficient of friction between the back-coat layer and the metal pin As shown in the FIGURE, a film 6 of 10 mm wide having a back-coat layer and wound around a let-off and take-up roll 1 was contacted with a metal fixing pin 3 having a diameter of 4 mm at a contact angle of 90 degrees through a tension detector 2. The film 6 was caused to vertically travel at a rate of 330 mm/min with one end thereof loaded by a weight 4 of 22.9 g while being controlled by a photosensor type limit switch 5. The film was taken up for 20 seconds and thereafter was let off for 20 seconds. Thus, one cycle of travel took 40 seconds. The dynamic friction after 50 cycles of travel was assumed as the coefficient of friction.

(3) Calendering resistance

A three-staged minisuper calender having a metal roll, a resin roll and a metal roll (produced by Yasui Kikai Seiki Co., Ltd.) was used. A sample was passed through the minisuper calender roll three times in such a manner that the back-coat layer was contacted with the resin roll. That is, the back-coat layer came into contact with the resin roll six times in total. The calendering conditions were that the pressure between the rolls was 300 kg/cm$^2$ by linear pressure, the surface temperature of the resin roll was 80° C. and the running rate was 10 m/min.

The calendering resistance was evaluated by the contamination of the resin roll after calendering and the presence or absence of the separation of the back-coat layer from the observation of the photograph of the surface of the back-coat layer.

(4) Transferring property of the magnetic layer

(A) Heat sealing method

By using a heat sealing tester TP-701 (trade name: produced by Tester Sangyo Co., Ltd.), a commercially available magnetic tape was placed on a film of the present invention so as to contact the magnetic layer of the commercially available magnetic tape with the back-coat layer of the film of the present invention, and the sample were heated and contact-bonded at 100° C. under a pressure of 15 kg/cm$^2$ for 60 minutes. Thereafter, the film was separated from the magnetic tape to judge the blocking property and whether or not the magnetic layer had been transferred to the back-coat layer (whether or not the magnetic layer was colored). When the transferring property of the magnetic layer of the commercially available magnetic tape was equal to that of the back-coat layer, it was judged to stand the test.

(B) Winding method

A commercially available magnetic tape was placed on a film of the present invention so as to contact the magnetic layer with the back-coat layer of the commercially available magnetic tape. They were wound in the overlapped state, and treated in a constant temperature bath at 160° C. for 20 hours and thereafter in a constant humidity bath at 40° C. and 80% RH for 120 hours. The evaluation of the transferring property of the magnetic layer was the same as in the heat sealing method.

(C) Magnetic layer coating method

To the opposite surface of a film to the surface subjected to backing treatment, the following magnetic coating was applied so as to form a magnetic layer. After the magnetic layer was oriented and dried, the film was wound into a roll and subjected to aging treatment at 60° C. for 20 hours. Whether the magnetic layer was transferred to the back-coat layer or not was observed. The thickness of the magnetic layer was 5 μm. The magnetic coating was produced by dispersing a coating having the following composition for 24 hours by an oscillating mill and mixing it with 5.6 parts (parts here and hereinunder means parts by weight in solid content) of polyisocyanate, Coronate L (trade name: produced by Nippon Polyurethane Co., Ltd.) for 20 minutes.

Composition of the coating

| | | |
|---|---|---|
| (1) | Polyurethane, Nippolan N-5033 (trade name: produced by Nippon Polyurethane Co., Ltd.) | 65 parts |
| (2) | Nitrocellulose, OHLESS FM200 (trade name: produced by Daicel Chemical Industries Ltd.) | 200 parts |
| (3) | Ethylene chloride-vinyl acetate copolymer, 1000 GKT (trade name: produced by Denki Kagaku Kogyo Kabushiki Kaisha) | 20 parts |
| (4) | Carbon black, Carbon black 300 (trade name: produced by Mitsubishi Kasei Corporation) | 12 parts |
| (5) | Soybean lecithin (produced by Kishida Kagaku Co., Ltd.) | 4 parts |
| (6) | Gamma iron oxide, γ LOP (trade name: produced by Titan Kogyo Kabushiki Kaisha) | 371 parts |
| (7) | As a solvent, mixture of toluene, methylethyl ketone, methylisobutyl ketone, etc., in the same weight ratio | 900 parts |

(5) Coating film strength (A) Cellophane tape rapid peeling test Cellotape (trade name: produced by Nichiban Co., Ltd.) of 18 mm wide was pasted on the surface of the back-coat layer to a length of 7 cm in such a manner as to prevent generation of air bubble, and a constant load was provided thereon by a 3 kg manual loading roll. The film was fixed and one end of the cellophane tape was connected to a weight of 500 g so that after the weight naturally dropped by a distance of 45 cm, the peeling test in the direction of 180 degrees was started.

(B) Susceptibility to scraping by fixing pin After testing the coefficient of friction between the back-coat layer and the metal pin, the presence or absence of a scuff or the like on the back-coat layer was observed.

(C) Susceptibility to scraping by woven cloth Scotch Dusting Fabric Tape No. 610 (trade name: produced by 3M Co.) of ½ inch wide was wound around a metal roll 35 mm in diameter. A film was wound around the thus-prepared roll at a contact angle of 180 such that the back-coat layer was in contact with the woven cloth. The roll was rotated for 15 seconds under a load of 102.9 g at a rate of 300 rpm, and the state of the separation of the back-coat layer or the scuff thereof was observed.

(6) Surface resistivity (A) In the case of $10^6 \Omega/\square$ or more A concentric electrode having an inner electrode 50 mm in diameter and an outer electrode 70 mm in diameter, 1G008A (trade name: produced by Yokokawa Hewlett Packard, Ltd.) was placed on a sample at 23° C. and 50% RH. A voltage of 100 V was applied to the electrode and the surface resistivity was measured by a high resistance meter 4329A (trade name: produced by Yokokawa Hewlett Packard, Ltd.)

(B) In the case of less than $10^6 \Omega/\square$ MCP-TESTER LURESTA-CP (trade name: produced by Mitsubishi Petro-Chemical Co., Ltd.) was used as a testing machine and MCP-TP01 (trade name: produced by Mitsubishi Petro-Chemical Co., Ltd.) was used as an electrode with a voltage of 5 V applied thereto.

(7) Average particle diameter

The average particle diameter was measured by a photographic method using an electron microscope or in the form of water-dispersed particles by using a centrifugal settling type particle size distribution measuring machine SA-CP3 (trade name: produced by Shimazu Corporation).

(8) Specific surface area

The specific surface area was measured by a nitrogen gas adsorbing device Quantasorp (trade name: produced by Quanta chrome Corp.).

(9) Light screening property (A) White light transmittance In accordance with JIS K6714, an integrating turbidimeter NDH-20D (trade name: produced by Nippon Denshoku Kogyo Kabushiki Kaisha) was used to measure the transmittance of all beams from a white-light source.

(B) Transmittance at 900 nm The transmittance of all beams was measured by an autographic spectrophotometer 340 (trade name: produced by Hitachi Ltd.)

EXAMPLE 1

A polyethylene terephthalate having an intrinsic viscosity of 0.65 and containing additional particles was melt-extruded at 280° to 300° C. and cast on a cooling drum by using electrostatic cooling method, thereby obtaining an amorphous film of 175 $\mu$m in thickness. This film was stretched at 95° C. by 3.5 times in the machine direction. After applying the following coating liquid A to the film, the film was stretched at 110° C. by 3.5 times in the transverse direction and then heat-treated at 210° C. to obtain a biaxially oriented polyester film.

The base film of the thus-obtained polyester film had a thickness of 14.3 $\mu$m and the coating layer (back-coat layer) had a thickness of 0.46 $\mu$m. A magnetic layer was applied to the opposite surface of the resultant film to the coating layer to produce a video tape.

EXAMPLE 2

A biaxially stretched polyester film was obtained in the same process as in Example 1 except for using the following coating liquid B. The thickness of the base film was 14.3 $\mu$m and the thickness of the coating layer (back-coat layer) was 0.55 $\mu$m. A magnetic layer was applied to the opposite surface of the film to the coating layer to produce a video tape.

EXAMPLE 3

A biaxially stretched polyester film was obtained in the same process as in Example 1 except for using the following coating liquid C. The thickness of the base film was 14.3 $\mu$m and the thickness of the coating layer (back-coat layer) was 0.60 $\mu$m. A magnetic layer was applied to the opposite surface of the film to the coating layer to produce a video tape.

EXAMPLE 4

A biaxially stretched polyester film was obtained in the same process as in Example 1 except for using the following coating liquid D. The thickness of the base film was 14.3 $\mu$m and the thickness of the coating layer (back-coat layer) was 1.0 $\mu$m. Concerning the surface roughness of the uncoated surface, Ra=0.014 $\mu$m, Rt=0.226 $\mu$m and Rz=0.179 $\mu$m. A magnetic layer was applied to the opposite surface of the film to the coating layer to produce a magnetic recording medium.

EXAMPLE 5

A biaxially stretched polyester film was obtained in the same process as in Example 1 except for using the following coating liquid E. The thickness of the base film was 14.3 $\mu$m and the thickness of the coating layer (back-coat layer) was 0.8 $\mu$m. A magnetic layer was applied to the opposite surface of the film to the coating layer to produce a magnetic recording medium.

EXAMPLE 6

A biaxially stretched polyester film was obtained in the same process as in Example 1 except for using the following coating liquid F. The thickness of the base film was 14.3 $\mu$m and the thickness of the coating layer (back-coat layer) was 0.6 $\mu$m. A magnetic layer was applied to the opposite surface of the film to the coating layer to produce a magnetic recording medium.

EXAMPLE 7

A biaxially stretched polyester film was obtained in the same process as in Example 1 except for using the following coating liquid G. The thickness of the base film was 14.3 $\mu$m and the thickness of the coating layer (back-coat layer) was 0.6 $\mu$m. A magnetic layer was applied to the opposite surface of the film to the coating layer to produce a magnetic recording medium.

EXAMPLE 8

A biaxially stretched polyester film was obtained in the same process as in Example 1 except for using the following coating liquid H. The thickness of the base film was 14.3 $\mu$m and the thickness of the coating layer (back-coat layer) was 1.0 $\mu$m. A magnetic layer was applied to the opposite surface of the film to the coating layer to produce a magnetic recording medium.

EXAMPLE 9

A biaxially stretched polyester film was obtained in the same process as in Example 1 except for using the following coating liquid I. The thickness of the base film was 14.3 $\mu$m and the thickness of the coating layer (back-coat layer) was 1.0 $\mu$m. A magnetic layer was applied to the opposite surface of the film to the coating layer to produce a magnetic recording medium.

Compositions of coating liquids A to I

"Parts" means parts by weight in a solid content.

Coating liquid A

Water-dispersed coating liquid composed of a mixture of 50 parts of monodisperse synthetic calcium carbonate particles having an average particle diameter of 0.20 $\mu$m, 30 parts of polyesterpolyurethane containing, as the main constituent, a polyester obtained from the reaction of a polyester and dimethylol propionate and isophorone diisocyanate, 1.0 part of a reaction product of a polyester which contains sodium sulfoisophthalate as the copolymerization constituent and glycidyl methacrylate, 5 parts of alkylol melamine and 5 parts of sodium alkylsulfonate.

Coating liquid B

Water-dispersed coating liquid composed of the same composition as the coating liquid A except that 25 parts of polyester polyurethane is used in place of 30 parts thereof and 5 parts of acrylic resin having anti-blocking property and 1 part of lithium perfluoroalkyl sulfonate are further added.

Coating liquid C

Water-dispersed coating liquid composed of the same composition as the coating liquid B except that 40 parts of synthetic calcium carbonate particles is used in place of 50 parts thereof and 10 parts of hollow particles of cross-linked styrene-acrylic resin having an average particle diameter of 0.3 μm is further added.

Coating liquid D

To Carbon Black 3170 (trade name: produced by Mitsubishi Kasei Corporation) having a specific surface area of 170 m²/g, a nonionic surfactant was added to obtain water-dispersed particles having an average particle diameter of 0.08 μm. The coating liquid D was obtained by dispersing in water a mixture of 35 parts of the thus-obtained carbon black, 45 parts of an aqueous polyurethane (composed of 90 parts of a carboxyl-group modulated polyester which is a reaction product of 94 parts of a polyester containing 60 mol % of terephthalic acid and 40 mol % of isophthalic acid as a dicarboxylic acid, and 61 mol % of ethylene glycol and 39 mol % of diethylene glycol as a glycol and 6 parts of 2,2-dimethylol propionate, and 10 parts of a polyurethane), 10 parts of Pesresin A517G (trade name: produced by Takamatsu Yushi Kabushiki Kaisha), which is a reaction product of a polyester and glycidyl methacrylate, and 10 parts of alkylol melamine.

Coating liquid E

Water-dispersed coating liquid having the same composition as the coating liquid D except that the average particle diameter of the carbon black is 0.09 μm.

Coating liquid F

Water-dispersed coating liquid having the same composition as the coating liquid E except that 30 parts of the carbon black, 50 parts of the polyurethane, 10 parts of Pesresin A517G and 10 parts of alkylol melamine were used.

Coating liquid G

To Carbon Black #3170 (trade name: produced by Mitsubishi Kasei Corporation) having a specific surface area of 250 m²/g, a nonionic surfactant was added to obtain water-dispersed particles having an average particle diameter of 0.15 μm. The carbon black obtained had a color close to black, while the carbon black in the coating liquid D was slightly reddish. A water-dispersed coating liquid was obtained in the same way as the coating liquid F except for using 30 parts of the thus-obtained carbon black.

Coating liquid H

To carbon black for dyes having a specific surface area of 137 m²/g, an oil absorption of 53 ml/100 g and an average primary particle diameter of 24 μm measured by an electron microscope, a nonionic surfactant was added to obtain water-dispersed particles having an average particle diameter of 0.04 μm measured by centrifugal settling. The coating liquid H was obtained by dispersing in water a mixture of 33 parts of the thus-obtained carbon black, 45 parts of an aqueous polyurethane (composed of 90 parts of a carboxyl-group modulated polyester which is a reaction product of 94 parts of a polyester containing 60 mol % of terephthalic acid and 40 mol % of isophthalic acid as a dicarboxylic acid and 61 mol % of ethylene glycol and 39 mol % of diethylene glycol as a glycol and 6 parts of 2,2-dimethylol propionate, and 10 parts of a polyurethane), 10 parts of a polyester, Finetex ES-670 (trade name: produced by Dai-Nippon Ink & Chemicals, Inc.), 10 parts of a high-molecular epoxy compound, Dickfine EN-027 (trade name: produced by Dai-Nippon Ink & Chemicals, Inc.) and 2 parts of a polytetrafluoroethylene, polyflon D-2 (trade name: produced by Daikin Kogyo Co., Ltd).

Coating liquid I

Water-dispersed coating liquid composed of a mixture of 33 parts of the carbon black used for the coating liquid H, 35 parts of the polyurethane used for the coating liquid H, 10 parts of Pateracol Exp. 382 (trade name: Dai-Nippon Ink & Chemicals, Inc.), which is a composite polyurethane modulated by a compound having a polymerizable carbon-carbon double bond, 10 parts of Pesresin IN-132-1 (trade name: produced by Takamatsu Yushi Kabushiki Kaisha), which is a polyester having a carboxyl group and modulated by methyl methacrylate, 5 parts of a high-molecular epoxy compound, Dickfine EN-027 (trade name: produced by Dai-Nippon Ink & Chemicals, Inc.), 5 parts of alkylol melamine, Bekkamin J101LF (trade name: produced by Dai-Nippon Ink & Chemicals, Inc.) and 2 parts of polytetrafluoroethylene, Fluon AD-1 (trade name: Asahi Fluoropolymer Co., Ltd.).

TABLE 1

| | Surface roughness of back coat layer (μ) | | | Surface roughness of untreated surface (μ) | | | Coefficient of friction between back coat layer and untreated surface | Coefficient of friction between back coat layer and metal pin | Surface intrinsic resistance of back coat layer (Ω/□) | Calendering resistance | Transferring property | Susceptibility to scraping by fixing pin | Transmittance (%) | |
|---|---|---|---|---|---|---|---|---|---|---|---|---|---|---|
| | Ra | Rt | Rz | Ra | Rt | Rz | | | | | | | White light | 900 m |
| Example 1 | 0.031 | 0.325 | 0.283 | 0.014 | 0.226 | 0.179 | 0.35 | 0.16 | 1 × 10¹² | Good | Good | Good | — | — |
| Example 2 | 0.032 | 0.400 | 0.364 | 0.014 | 0.226 | 0.179 | 0.35 | 0.15 | 1 × 10¹² | Good | Good | Good | — | — |
| Example 3 | 0.061 | 0.688 | 0.596 | 0.014 | 0.226 | 0.179 | 0.33 | 0.13 | 3 × 10¹² | Good | Good | Good | — | — |
| Example 4 | 0.095 | 0.973 | 0.831 | 0.014 | 0.226 | 0.179 | 0.30 | 0.19 | 10⁶> | Good | Good | Good | 7 | 4 |
| Example 5 | 0.086 | 0.664 | 0.590 | 0.014 | 0.226 | 0.179 | 0.33 | 0.22 | 10⁶> | Good | Good | Good | 18 | 17 |
| Example 6 | 0.056 | 0.460 | 0.395 | 0.014 | 0.226 | 0.179 | 0.34 | 0.26 | 10⁶> | Good | Good | Good | 26 | 28 |
| Example 7 | 0.091 | 0.855 | 0.821 | 0.014 | 0.226 | 0.179 | 0.35 | 0.18 | 10⁶> | Good | Good | Good | 39 | 18 |
| Example 8 | 0.035 | 0.495 | 0.400 | 0.014 | 0.226 | 0.179 | | 0.17 | 5 × 10⁵ | Good | Good | Good | 4.0 | — |
| Example 9 | 0.038 | 0.500 | 0.420 | 0.014 | 0.226 | 0.179 | | 0.16 | 5 × 10⁵ | Good | Good | Good | 4.3 | — |

What is claimed is:

1. A magnetic recording medium comprising a biaxially stretched polyester film layer, a coating magnetic layer on one side of said polyester film layer, and a back-coat layer formed by an in-line coating method on the other side of said polyester film layer, which is prepared from a composition comprising an aqueous polymer containing 10-60 wt. % of at least one type of fine particle having an average particle diameter of 0.01 to 0.5 μm, selected from the group consisting of carbon black particle, aqueous fluorine polymer particle and synthetic calcium carbonate particle; the thickness of said back-coat layer being 0.2 to 1.5 μm, the center line average roughness (Ra) of said back-coat layer being 0.015 to 0.10 μm; wherein the average particle diameter of said carbon black particle is 0.01 to 0.20 μm; wherein the average particle diameter of said aqueous fluorine polymer particle, when present, is 0.05 to 0.3 μm; wherein the content of said carbon black particle in said back-coat layer, when present, is 10 to 50 wt. %; and wherein the content of said aqueous fluorine polymer particle, when present, in said back-coat layer is 0.1 to 20 wt. %.

2. A magnetic recording medium according to claim 1, wherein said aqueous polymer is an aqueous polyurethane or aqueous polyester.

3. A magnetic recording medium according to claim 2, wherein said aqueous polyurethane is a polyurethane having an anionic group.

4. A magnetic recording medium according to claim 2, wherein said aqueous polyester is a polyester having an anionic group.

* * * * *